United States Patent [19]

Fromson

[11] 4,092,925

[45] June 6, 1978

[54] LITHOGRAPHIC PRINTING PLATE SYSTEM

[76] Inventor: Howard A. Fromson, 15 Rogues Ridge Rd., Weston, Conn. 06066

[21] Appl. No.: 711,930

[22] Filed: Aug. 5, 1976

[51] Int. Cl.[2] .......................... B41C 1/10; B32B 7/14

[52] U.S. Cl. ........................................ 101/467; 96/33; 101/401.1; 101/369; 101/382 MV; 156/291; 101/415.1

[58] Field of Search ...................... 101/401.1, 395, 368, 101/369, 127.1, 128.3, 456, 382 MV; 156/291; 96/33

[56] References Cited

U.S. PATENT DOCUMENTS

| | | | |
|---|---|---|---|
| 637,554 | 11/1899 | Rossel | 101/459 |
| 1,941,681 | 1/1934 | Gollwitzer | 101/415.1 |
| 2,016,517 | 10/1935 | Rowell | 101/466 |
| 2,237,346 | 4/1941 | Gilfillan | 156/291 |
| 2,375,603 | 5/1945 | Willard | 101/415.1 |
| 2,875,687 | 3/1959 | Renauer | 101/369 |
| 3,010,394 | 11/1961 | Borchers et al. | 101/395 |
| 3,313,626 | 4/1967 | Whitney | 101/467 |
| 3,457,856 | 7/1969 | Rydberg et al. | 101/127.1 |
| 3,670,646 | 6/1972 | Welch | 101/415.1 |
| 3,696,745 | 10/1972 | Morton | 101/415.1 |
| 3,776,798 | 12/1973 | Milano | 156/291 |
| 3,824,927 | 7/1974 | Pugh et al. | 101/395 |

*Primary Examiner*—Clyde I. Coughenour
*Attorney, Agent, or Firm*—Burgess, Dinklage & Sprung

[57] ABSTRACT

A lithographic printing plate system utilizing a composite plate having an aluminum printing member that can be recycled. An aluminum printing member has a light-sensitive coating thereon which forms the image area of the plate together with the aluminum member itself. A carrier plate supports the aluminum member. The carrier plate and the aluminum member are preferably releasably adhered together outside the image area of the plate, that is, along transverse and/or longitudinal edge positions adjacent the image area. The aluminum member is readily separated from the carrier plate for recycling after the printing run and the carrier plate can be reused or recycled.

3 Claims, 10 Drawing Figures

LITHOGRAPHIC PRINTING PLATE SYSTEM

BACKGROUND

This invention relates to a composite lithographic printing plate and method therefor. More particularly, this invention relates to a lithographic printing plate system which greatly reduces the cost involved in printing, for example, using offset or direct litho (di-litho) printing presses and aluminum base printing plates.

Aluminum base lithographic printing plates, such as described in my U.S. Pat. No. 3,181,461 issued May 4, 1965, have come into wide use in the printing industry and especially in lithographic printing using offset and di-litho printing presses. This use is increasing with the conversion of letterpress printing presses for newspapers to di-litho systems where printing is carried out with direct contact between the printing plate and the newsprint.

Aluminum base plates are attractive because they offer durability, long press runs and reproducible, reliable quality printing. However, cost is a factor and even though used aluminum printing plates can be recycled, the cost compared to the relatively short period of use is still high. This applies to both wipe-on and presensitized lithographic printing plates.

The present invention provides a lithographic printing plate system that retains all of the benefits and advantages gained through the use of an aluminum printing member yet greatly reduces the cost involved.

SUMMARY

The composite lithographic printing plate of the present invention is characterized by an aluminum printing member that can be recycled. The aluminum printing member has a light-sensitive coating thereon and the aluminum member and the coating together form the image area of the plate, that is, after exposing and developing the member in the conventional fashion. A carrier plate supports the aluminum member and is preferably releasably adhered to the aluminum member outside the image area of the plate, for example along transverse and/or longitudinal edge portions adjacent but outside the image area.

An important feature of the invention resides in the fact that the aluminum member is readily separated from the carrier plate for recycling. This means that there is no aluminum lost or wasted. Even though considerably less aluminum is utilized in the present invention in making lithographic printing plates, the aluminum component of the composite printing plate can be recycled completely in the same fashion that all aluminum printing plates are currently recycled.

According to the invention, the aluminum printing member is less thick than conventional, all aluminum printing plates by virtue of the supporting carrier plate. That is, the aluminum printing member will be generally less than 9 mils thick and can be as thin as about 2 mils thick.

DESCRIPTION OF THE DRAWING

The present invention will be more fully understood from the following description taken in conjunction with the accompanying drawing wherein.

DESCRIPTION

Figure 1:
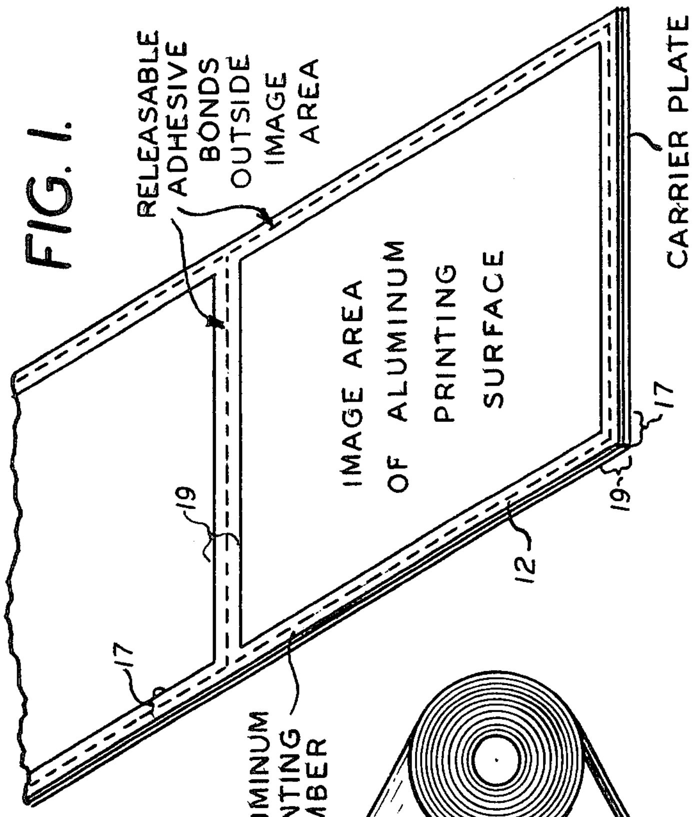
FIG. 1 is a perspective view showing a composite laminate for making composite lithographic printing plates according to the invention.

In the following, three embodiments of the invention are described. The first, which is shown in FIGS. 1–4 of the drawing and which is the preferred embodiment, involves the use of a composite coil made from aluminum foil and a web of a carrier material, the two being releasably adhered outside the image area of the plate along longitudinal edge portions. Here the composite coil is cut and the composite base plate, that is the printing member and the carrier, are bent, punched, or crimped for mounting on a printing press.

Figure 5:
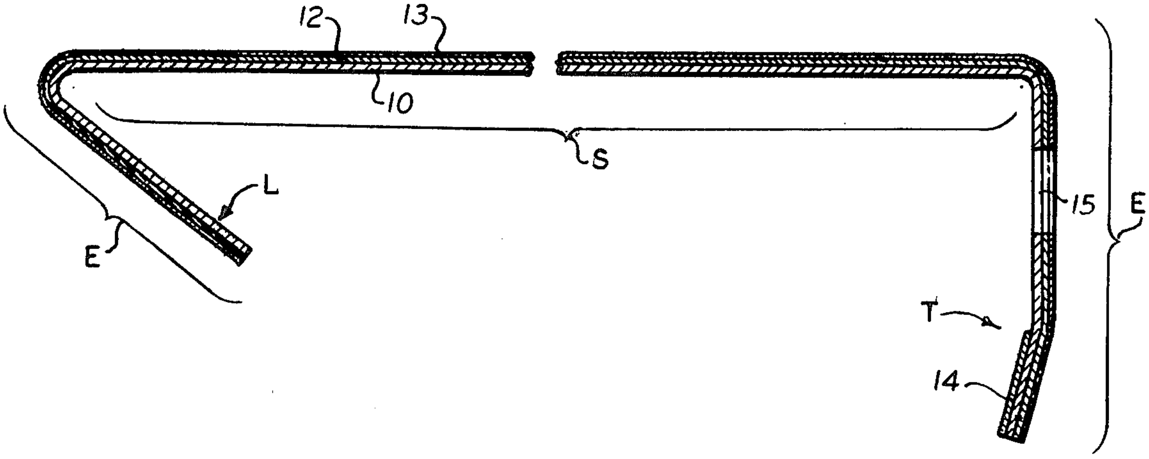
FIG. 5 is a side view and cross-section showing a composite lithographic printing plate according to the invention.
Figure 6:
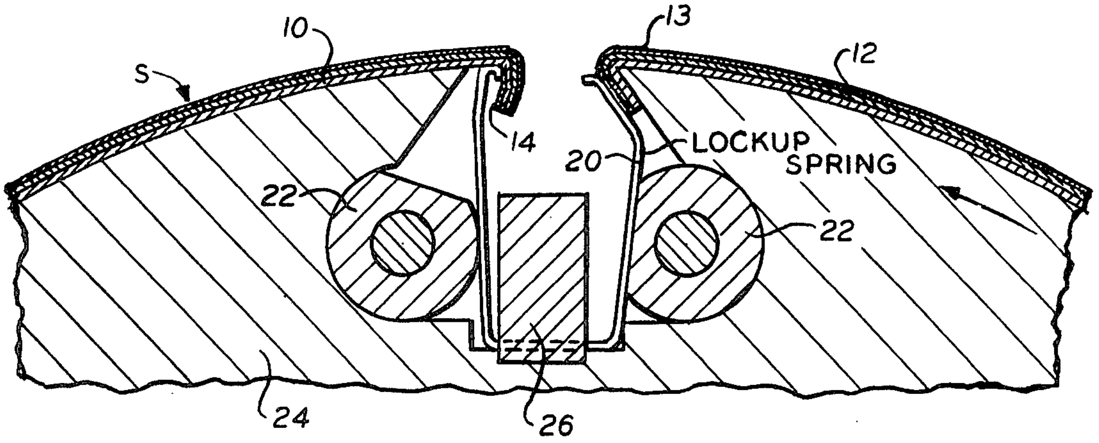
FIG. 6 is a cross-sectional view, partly broken away, showing the composite printing plate of FIG. 5 mounted on a printing press.
Figure 7:
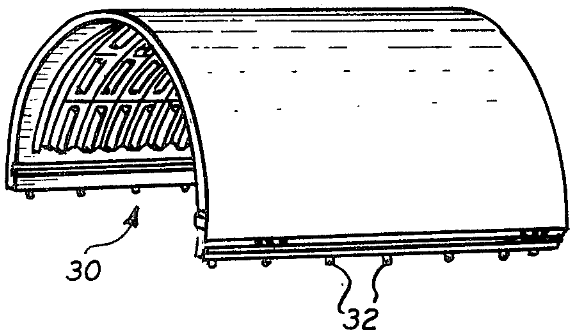
FIG. 7 is a perspective view of a saddle conventionally used to convert letterpress printing presses to direct lithographic printing and upon which the composite printing plate of the invention is mounted.

In the next embodiment, the aluminum printing member can be cut from a coil but the carrier is prebent (FIGS. 5–7). Here the printing member and prebent carrier are locked up together in face-to-face contact or releasably adhered along edge portions outside the image area.

Figure 8:
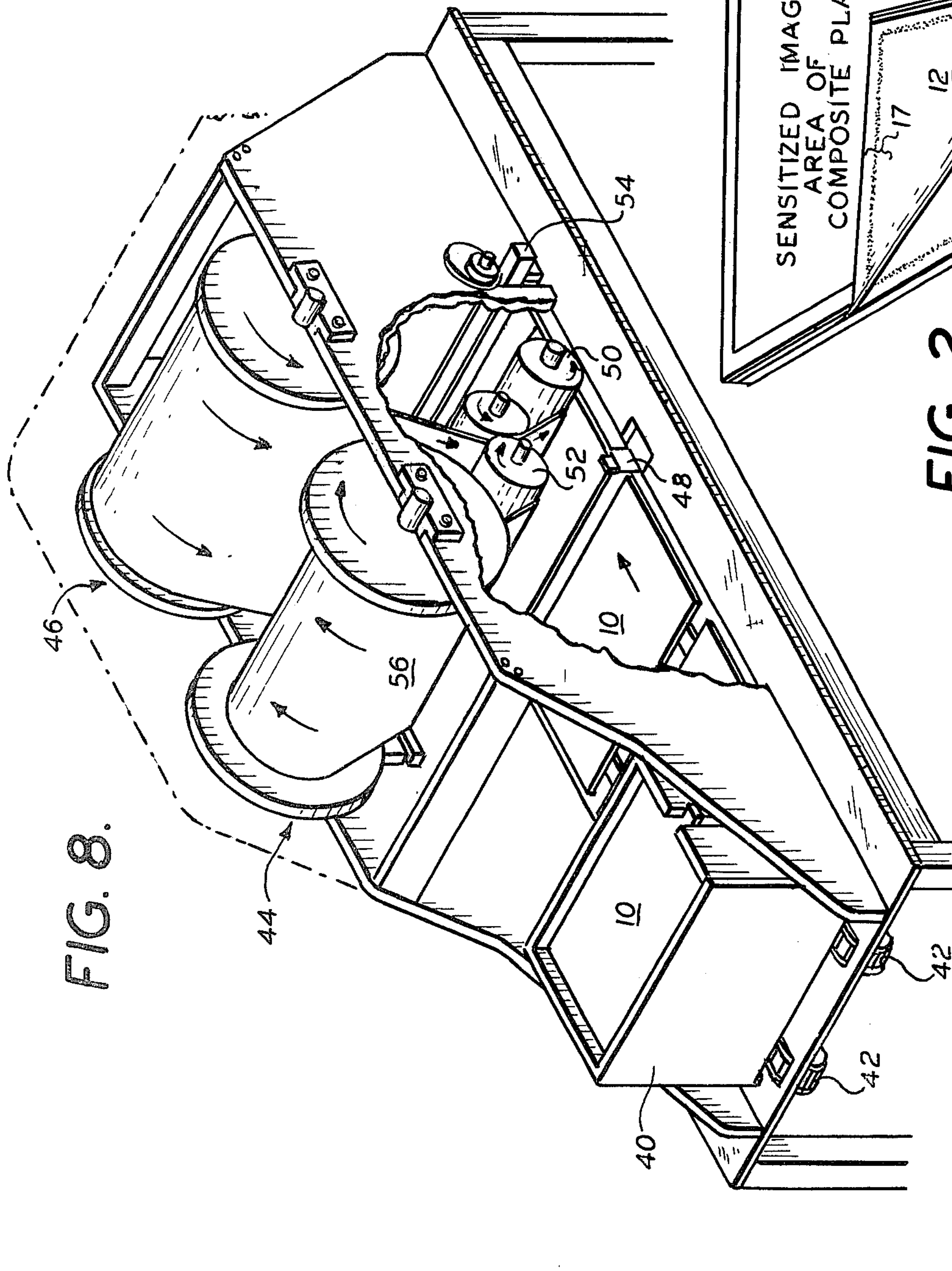
FIG. 8 is a perspective view partly broken away of apparatus for making composite laminated printing plates according to another embodiment of the invention.
Figures 9, 10:
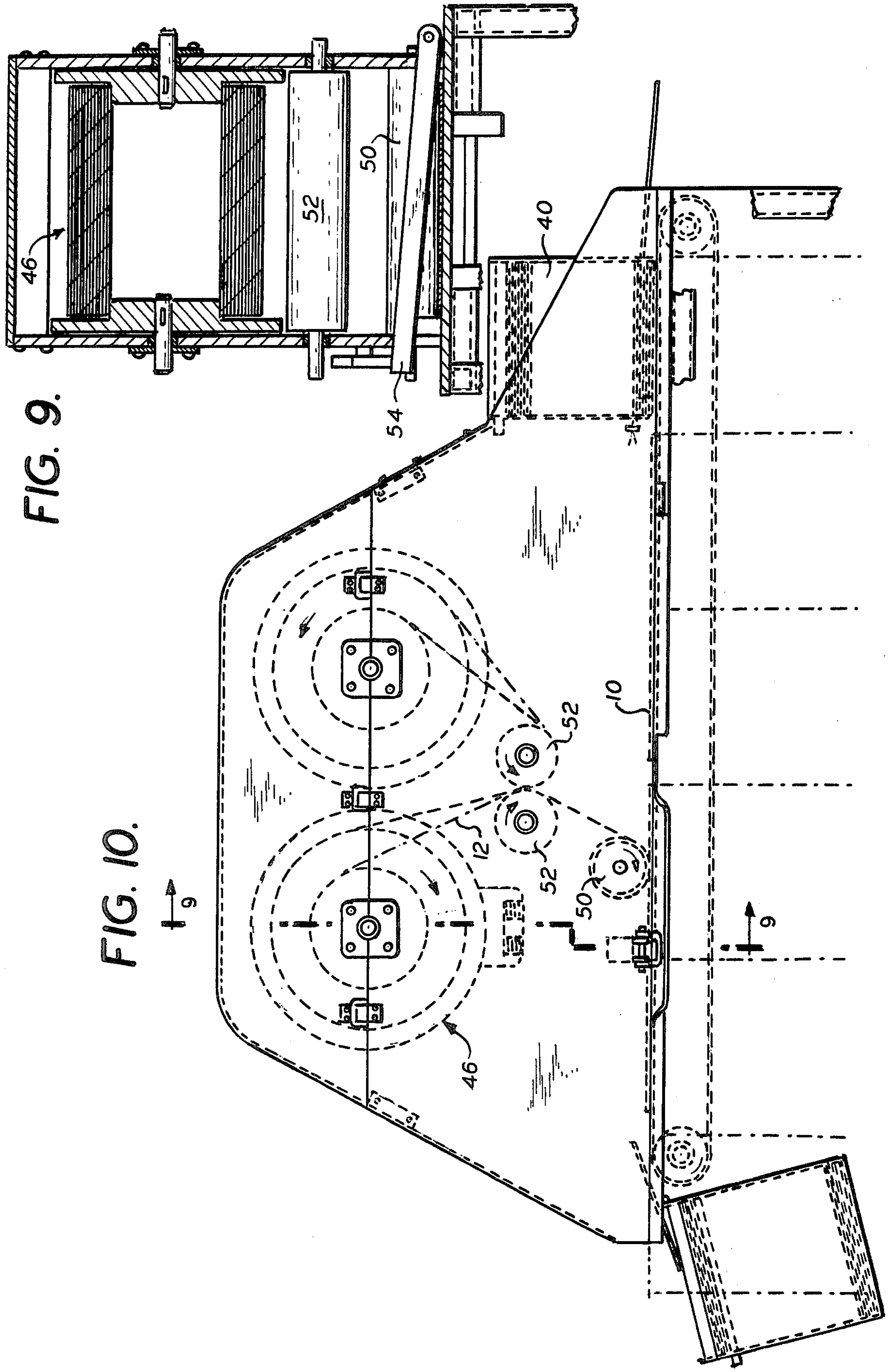
FIG. 9 is a side view of the apparatus shown in FIG. 4.
FIG. 10 is an end view of the apparatus shown in FIG. 4.

In the embodiment shown in FIGS. 8–10, the carrier is flat (not prebent) and a pre-glued printing member, in coil form, is cut to size and releasably adhered to the flat carrier. The laminate can then be bent, or crimped or punched for conventional lock up or a magnetic lock up can be used in which case the plate is simply curved on the press.

Figure 2:
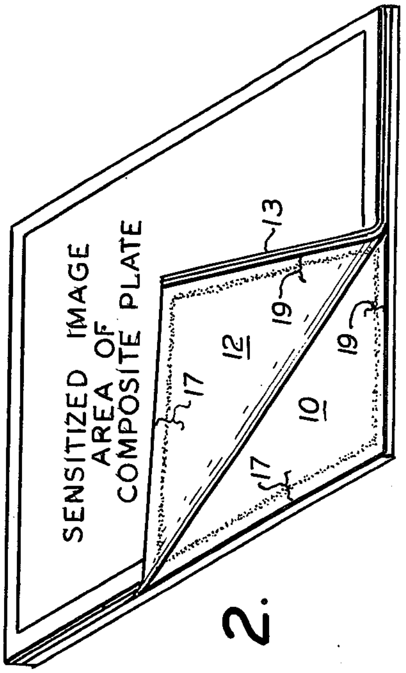
FIG. 2 is a perspective view showing a composite lithographic printing plate according to the invention.

Referring now to the drawing and especially to FIG. 2, the composite lithographic printing plate of the invention includes a readily separable aluminum printing member 12 that can be recycled. The aluminum printing member 12 has a light-sensitive coating 13 thereon which forms the image area for the printing plate together with the aluminum member 12. A carrier plate 10 supports the aluminum printing member 12 and is readily separable from the aluminum member 12 for recycling.

Figure 3:
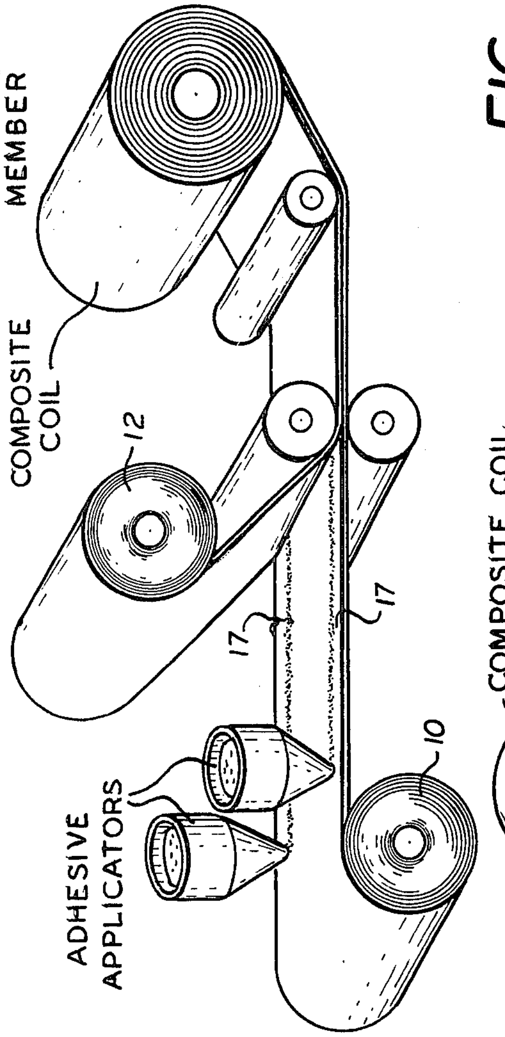
FIG. 3 is a perspective view showing the formation of the composite laminate shown in FIG. 1.

As shown in FIGS. 1 and 3, composite printing plates are preferably formed in a continuous fashion from a continuous aluminum web, preferably having a thickness in the range of from about 2 to about 4 mils, and a continuous web of carrier material having a thickness such that the total composite laminate equals the thickness of conventional all aluminum lithographic printing plates. The carrier material can be any desired material such as metals such as aluminum, plastic such as polyethylene, paper, cardboard and the like and laminates as well such as plastic coated paper.

In a preferred embodiment, the aluminum printing member 12 is releasably adhered together with the carrier plate 10 outside the image area of the plate, that is, along transverse and/or longitudinal edge portions adjacent the image area. These adhesive bonding areas are shown in the drawing, FIG. 1, by dotted lines adjacent the image area and by the reference numerals 17 and 19. As shown in FIG. 2, the preferred embodiment involves a longitudinal adhesive bond along edge portions adjacent and outside of the image area. Transverse applications of an adhesive can be made with a suitable traversing device which can be easily adapted for use in the arrangement shown in FIG. 2.

According to the invention, the adhesive bond in the areas 17 and/or 19 must be releasable so that the aluminum printing member and the carrier plate 10 can be easily separated after the printing run for recycling of the aluminum 12 and recycling or reusing the carrier plate 10. Any known releasable adhesive can be used for this purpose including low molecular weight polyethylene-base hot melt adhesives, pressure-sensitive adhesives, contact adhesives and the like.

Figure 4:
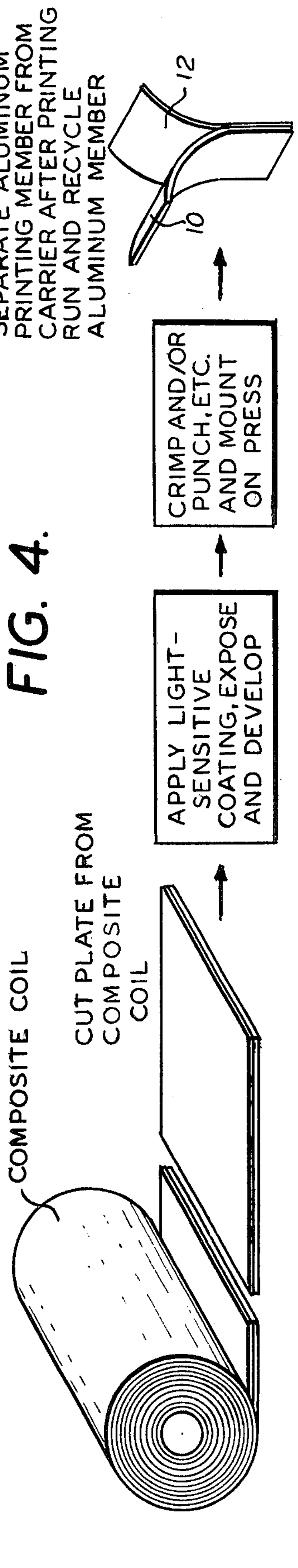
FIG. 4 is a combination perspective and block diagram illustrating the use of the composite laminate made according to FIG. 3 in the preparation and use of a composite lithographic printing plate according to the invention.

As shown in FIG. 4, a coil of composite laminate made as illustrated in FIG. 3 can be used for the preparation of presensitized or wipe-on lithographic printing plates. In the case of the former, the light-sensitive coating would be applied to the coil of composite laminate by the manufacturer and would be cut into plates of desired length and sold to the printer or the printer could purchase a coil of composite laminate coated with the light-sensitive material from the manufacturer and cut his own plates from the coil prior to use. In the case of wipe-on plates, the printer could again purchase either a composite laminate coil or precut base plates. In any event, the light-sensitive coating would be applied to the precut composite laminate using conventional techniques and conventional light-sensitive material such as a diazo sensitizer. Following this, the presensitized or wipe-on lithographic plate would be exposed and developed in the conventional manner, crimped and/or punched in preparation for mounting on a printing press in the usual fashion, then mounted on a printing press using conventional lock-up devices. Following the printing run, the aluminum printing member 12 is separated from the carrier plate by delaminating the composite laminate and recycling the aluminum member and reusing the recycling carrier member.

According to the invention, the aluminum printing member can be readily separated from the carrier plate for recycling. The aluminum printing member can be simply prebent to conform to the configuration of a prebent carrier plate and the two physically held together by use of a lock-up device on the printing press as is described in greater detail below. In the preferred embodiment described above with reference to FIGS. 1–4, the lithographic printing plate of the invention is prepared from composite laminate which is made in continuous coil form from an aluminum web 12 and a carrier web 10 which is selectively adhered together in a releasable fashion along longitudinal edge portions adjacent to and outside the image area of the finished plate. In the third embodiment, described below, the aluminum printing member 12 and the carrier plate 10 can be completely releasably adhesively secured.

Referring now to FIGS. 5 and 6, the alternate composite lithographic printing plate is shown to include an aluminum lamina or printing member 12 having a light-sensitive coating 13 thereon. In practice, the aluminum member 12 is initially flat and the light-sensitive coating 13 is applied while the aluminum member 12 is in this state. Formation of the printing surface for the printing plate, using conventional exposure and developing techniques are also carried out while the aluminum member 12 is completely flat.

As is well understood in the art, the formation of the printing surface of a lithographic printing plate involves the formation of a negative or positive image on the surface of the aluminum printing member which means that the printing surface is made of a combination of the developed light-sensitive coating in the desired negative or positive pattern and exposed portions of the aluminum printing member itself which comes about upon developing of the plate.

The carrier plate 10 (FIG. 5) is a reusable member having sufficient strength to withstand the stresses and forces normally encountered in lithographic printing. The carrier plate 10 can be formed from any number of materials meeting this criteria, for example metals and plastics and it is preferably made of a long-wearing materials such as stainless steel or high grade aluminum alloy. The carrier plate 10 is prebent or crimped for mounting on otherwise conventional lithographic printing presses. A suitable configuration is shown in FIG. 5 of the drawing and the composite lock-up plate is shown mounted on the drum of an offset printing press in FIG. 6.

After the printing surface S is formed on the aluminum printing member 12 while it is in a flat state, the printing member 12 is bent or crimped by hand or using automatic or semi-automatic devices well known in the art, so as to conform to the configuration of the prebent carrier plate 10. In the configuration shown in FIG. 5, the printing member 12 and the carrier plate 10 have corresponding transverse edge portions E one of which forms the leading edge L and the other trailing edge T.

In the preferred embodiment of the invention, the aluminum printing member 12 and the carrier plate 10 are in only face-to-face physical contact, in the image area S. The corresponding edge portions E of the carrier plate 10 and the printing member 12 are adapted to be simultaneously engaged by a lock-up device as shown in FIG. 6 for mounting the plate 10 and the printing member 12 together on an otherwise conventional printing press, either offset or di-litho. FIG. 6 shows a conventional offset lock-up arrangement wherein the crimped edge portions of the composite plate are engaged by a lock-up spring 20 which is held in place by member 26 and tensioned by cam members 22, all mounted within the groove of the offset printing drum 24.

The light-sensitive coating 13 can be applied by the manufacturer and can be furnished to the plate user in precut or coil form. Plates of this type are generally referred to in the art as presensitized plates. It is also possible to apply the light-sensitive coating 13 just prior to formation of the printing surface and mounting on a printing press using the so-called wipe-on technique which is widely practiced by low-volume and short-run printers, for example local newspapers. The manufacture, developing and use of presensitized and wipe-on printing plates are well known in the art and the present invention makes it possible for printers and manufacturers to continue to employ these techniques using, however, much less aluminum.

The aluminum printing member 12 is generally less than 9 mils thick, preferably from about 2 mils to about 7 mils thick and more preferably, from about 4 to 6 mils thick. The thickness of the carrier plate 10 will depend on the thickness of the aluminum printing member 12 and is generally chosen such that the overall thickness of the composite plate will equal the thickness of conventional lithographic printing plates such as those made from all aluminum so that the conventional lock-up and mounting devices can be employed without modification or change.

The aluminum printing member 12, after formation of the image area S, is bent or crimped to conform to the configuration of the prebent carrier plate 10 (FIG. 5) and the printing member 12 and the supporting plate 10 are then locked up on a printing press, for example as shown in FIG. 6. If desired, to ensure alignment between the printing member 12 and the carrier plate 10, alignment slots or holes 15 can be employed (FIG. 5) and/or the carrier plate 10 and the aluminum printing member 12 can be releasably adhered together in the area of the edge portions E. This means that a releasable adhesive such as a pressure or contact sensitive adhesive can be used in spot or strip form at the interface between the aluminum printing member 12 and the carrier plate 10 in the area of the cooperating edge portions E. If desired, a similar adhesive bond can be utilized along longitudinal edge portions of the printing member 12 and the carrier plate 10 outside and adjacent to the image area S, for example in the area of the cooperating edge portions E or along longitudinal edge portions adjacent to the image area S.

FIG. 7 shows a conventional saddle member 30 having aligning and mounting pins 32 which are adapted to engage cooperating apertures in the transverse edge portions of the printing member 12 and the supporting plate 10 (FIGS. 2 and 5). Saddle member such as shown in FIG. 7 are utilized for direct lithographic printing on converted letterpress printing presses. Such converted letterpress printing presses are widely used in the newspaper industry.

In a further embodiment of the present invention, the carrier plate 10 and the aluminum printing member 12 can be releasably adhered together and the carrier plate 10 can be made of a magnetic material for magnetic mounting on a printing press. Such mounting devices are well known in the art.

In a further embodiment of the invention, the aluminum printing member in coil or precut form can be releasably adhered to the carrier plate 10.

An important feature of the present invention resides in the fact that after the printing run, the aluminum printing member 12 can be readily separated from the carrier plate 10 and recycled as is presently practiced with all aluminum lithographic printing plates. The carrier plate 10 (FIG. 5) can be then easily be prepared for use over again with a new aluminum printing member 12 having a developed printing surface thereon.

Tempered aluminum should be employed for forming composite printing plates according to the invention. Softer aluminum foil is not suitable because it will tear or rip when engaged by the lock-up device of a printing press. Tempered aluminum generally has a temper rating of between H12 and H19 where direct cold reduction is employed or between H22 and H27 where a combination of cold reduction and back annealing are employed, as specified by the American Aluminum Association in *Aluminum Standards and Data,* published by Association.

The aluminum printing member can be made in any fashion known in the art, for example as taught by the following patents:

U.S. Pat. No. 2,714,066, Jewitt et al, July 26, 1955;
U.S. Pat. No. 2,741,981, Frost, Apr. 17, 1956;
U.S. Pat. No. 2,791,504, Plambeck, May 7, 1957;
U.S. Pat. No. 3,062,648, Grawford, Nov. 6, 1962;
U.S. Pat. No. 3,181,461, Fromson, May 4, 1965;
U.S. Pat. No. 3,220,346, Strickler, Nov. 30, 1965;
U.S. Pat. No. 3,280,734, Fromson, Oct. 25, 1966; and
U.S. Pat. No. 3,338,164, Webers, Aug. 29, 1967. Especially preferred is an anodically oxidized aluminum printing member having an aluminum oxide surface which is initially porous after anodic oxidation and subsequently treated with an alkali metal silicate and sealed prior to application of the light-sensitive coating. This is the subject of my U.S. Pat. No. 3,181,461 referred to above.

It is preferred to continuously anodize aluminum for the aluminum printing member utilizing the anodizing techniques described in my patents U.S. Pat. No. 3,865,700 issued Feb. 11, 1975, and U.S. Pat. No. 3,920,525 issued Nov. 18, 1975. If desired, the aluminum printing member can be provided with a composite anodized and discontinuously electroplated surface prior to application of the light-sensitive coating as taught in my U.S. Pat. No. 3,929,594 issued Dec. 30, 1975.

The light-sensitive coating has one solubility in relation to a solvent in a state before exposure to actinic radiation and another solubility in relation to said solvent in another state after exposure to actinic radiation, said light-sensitive coating being soluble in said solvent in one of said states and being insoluble in said solvent in its other state.

The light-sensitive layer or coating used in this invention may be formed from a host of photochemical materials known in the art. Such light-sensitive materials include dichromated colloids, such as those based on organic colloids, gelatin, process glue, albumens, caseins, natural gums, starch and its derivatives, synthetic resins, such as polyvinyl alcohol and the like; unsaturated compounds such as those based on cinnamic acid and its derivatives, chalcone type compounds, stilbene compounds and the like; and photopolymerizable compositions, a wide variety of polymers including vinyl polymers and copolymers such as polyvinyl alcohol, polyvinyl acetals, polyvinyl acetate vinyl sorbate, polyvinyl ester acetal, polyvinyl pyrrolidone, polyvinyl butyrol, halogenated polyvinyl alcohol; cellulose based polymers such as cellulose-acetate hydrogenphthalate, cellulose alkyl ethers; ureaformaldehyde resins; polyamide condensation polymers; polyethylene oxides; polyalkylene ethers, polyhexamethylene adipamide; polycholorophene; polyethylene glycols, and the like. Such compositions utilize as initiators carbonyl compounds, organic sulphur compounds, peroxides, redox systems, azo and diazo compounds, halogen compounds and the like. These and other photochemical materials including their chemistry and uses are discussed in detail in a text entitled *Light-Sensitive Systems,* Jaromir Kosar, John Wiley and Sons, Inc., New York 1965.

Diazo resins are particularly preferred as a printing plate for lithographic or letterpress printing.

The light-sensitive coating will be referred to herein for ease in understanding as being soluble in relation to a solvent before exposure to actinic radiation and insoluble with respect to said solvent after exposure to actinic radiation, it being understood that light-sensitive materials which behave in the opposite manner, that is first insoluble and then soluble after exposure, are within the purview of the present invention.

As used herein, the terms "soluble" and "insoluble" are intended to convey the meaning generally accepted and understood in the art of exposing and developing images utilizing light-sensitive systems. For example, a light-sensitive material is considered to be soluble when it can be readily removed by washing with a particular solvent at normal operating temperatures such as room temperature and insoluble when it is not removed upon exposure to a particular solvent under the same or similar temperature conditions.

If desired, the aluminum printing member can be provided with a tough, wear-resistant protective layer as taught in my U.S. Pat. No. 3,773,514 issued Nov. 20. 1973.

In general, composite lithographic printing plates according to the invention having an aluminum printing member that can be recycled are made by applying a light-sensitive coating to a composite laminate (FIGS. 1-3) or to an aluminum member (FIG. 5) each preferably having an anodized and treated aluminum member as taught by my patent U.S. Pat. No. 3,181,461. The light-sensitive coating can be applied by the manufacturer of the aluminum printing member to provide presensitized aluminum printing members in coil or precut form, or the light-sensitive coating can be applied by the end user, the printer, using the wipe-on technique.

The aluminum printing member, in a flat condition, is then exposed and developed in a conventional manner to form the printing surface for the composite plate of the invention (FIG. 5). The developed printing member is then supported on a carrier plate which is mounted on a printing press, for example as shown in FIG. 6 of the drawing. Following the end of the printing run, the aluminum printing member is readily separated from the carrier plate for recycling while the carrier plate itself can be reused with a freshly prepared aluminum printing member.

FIGS. 8-10 of the drawing are directed to a further embodiment of the invention wherein the aluminum printing member is releasably adhered to a carrier plate. In this embodiment, an aluminum web in coil form, with or without a light-sensitive coating thereon, is releasably adhered to a carrier plate which can be made of a magnetic material in which case the entire releasably adhered laminate can be maintained flat throughout the laminating and developing operation or it can be a prebent carrier plate for use in conventional lock-up systems for lithographic printing presses.

FIGS. 8-10 show one embodiment for forming composite laminated lithographic printing plates having an aluminum printing member which is releasably adhered to a carrier plate 10. The carrier plate is flat and is adapted for lock-up using a magnetic lock-up system. According to this embodiment, flat, precut carrier plates 10 preferably made of stainless steel are fed individually via plate feeder 40 to transport belts 42. Individual plates are fed under lay-on roll 50 which laminates a preadhered printing member 12 to the carrier plate 10. A coil of barrier, non-sticking paper 56 is separated from the preadhered printing member 12 (using a pressure-sensitive or contact adhesive) via feed rollers 52 and the individual printing members are cut to size according to the size of the carrier plates 10 via cam actuated cutting bar 54. The aluminum printing member is provided with an adhesive coating and is fed from feed roller 46 while take-up roller 44 takes the paper return for paper 56 (see FIG. 5).

As will be evident to those skilled in the art, the apparatus shown in FIGS. 4-6 can be modified to accomodate prebent carrier plates for use in conventional lock-up devices.

What is claimed is:

1. Method for making composite lithographic substrates having an aluminum printing member which is recyclable, comprising:

providing a continuous web of carrier material having a given width;

providing a continuous aluminum web having the same width as the carrier web and a central longitudinal portion defining an image area;

continuously applying a releasable adhesive on at least one of the carrier web and the aluminum web along at least two longitudinal lines disposed outside of the image area;

releasably adhering the two webs along the longitudinal lines to form a composite web;

transversely cutting the composite web to form discrete printing plates wherein the carrier and aluminum portions for a plate have the same length;

applying a light sensitive coating on the aluminum member of the discrete plate and exposing and developing the light sensitive coating in the image area thereof;

mounting the discrete plate on a printing press; and separating the aluminum member from the carrier after use on the printing press to effect the recycling of the aluminum members.

2. Method according to claim 1, wherein the carrier material comprises magnetic material and the plate is magnetically mounted on the printing press.

3. Method according to claim 1, wherein the applying step further comprises applying releasable adhesive in spaced apart parallel transverse lines corresponding to the transverse lines at which the composite web is cut and further defining the image area as the area therebetween.

* * * * *